US012123340B1

(12) United States Patent
Brusaferri

(10) Patent No.: US 12,123,340 B1
(45) Date of Patent: Oct. 22, 2024

(54) GAS-POWERED INTERNAL COMBUSTION ENGINE

(71) Applicant: Sergio Daniel Brusaferri, Philadelphia, PA (US)

(72) Inventor: Sergio Daniel Brusaferri, Philadelphia, PA (US)

( * ) Notice: Subject to any disclaimer, the term of this patent is extended or adjusted under 35 U.S.C. 154(b) by 0 days.

(21) Appl. No.: 18/762,840

(22) Filed: Jul. 3, 2024

(51) Int. Cl.
*F02B 55/08* (2006.01)
*F02B 53/04* (2006.01)
*F02B 53/06* (2006.01)
*F02B 55/02* (2006.01)
*F02B 55/16* (2006.01)

(52) U.S. Cl.
CPC .............. *F02B 55/08* (2013.01); *F02B 53/04* (2013.01); *F02B 53/06* (2013.01); *F02B 55/02* (2013.01); *F02B 55/16* (2013.01)

(58) Field of Classification Search
CPC .......... F02B 53/04; F02B 53/06; F02B 55/02; F02B 55/08; F02B 55/16
See application file for complete search history.

(56) References Cited

U.S. PATENT DOCUMENTS

| | | | | |
|---|---|---|---|---|
| 955,925 A * | 4/1910 | Van Alstyne | G05D 13/08 | 418/44 |
| 1,095,034 A * | 4/1914 | Sanchez | F01C 1/077 | 418/36 |
| 1,293,459 A * | 2/1919 | Johnson | F04C 2/3446 | 418/231 |
| 1,904,892 A * | 4/1933 | Trube | F01C 1/067 | 418/38 |
| 2,409,141 A * | 10/1946 | Margolis | F02B 53/06 | 418/248 |
| 3,820,516 A * | 6/1974 | Paleologos | F01C 1/077 | 418/36 |
| 3,924,578 A * | 12/1975 | Howard | F02B 53/04 | 123/228 |
| 4,127,036 A | 11/1978 | Pinto | | |
| 7,255,086 B2 * | 8/2007 | Kovalenko | F01C 1/07 | 74/52 |
| 8,931,455 B2 | 1/2015 | Hughston | | |
| 9,249,722 B2 | 2/2016 | Hughston | | |
| 9,347,369 B2 | 5/2016 | Herbruck et al. | | |
| 9,523,276 B2 | 12/2016 | Gennisieux et al. | | |
| 9,638,154 B2 | 5/2017 | Gernster | | |
| 2007/0023001 A1 | 2/2007 | Okulov | | |
| 2018/0087454 A1 | 3/2018 | Cunninghm et al. | | |

FOREIGN PATENT DOCUMENTS

| | | | |
|---|---|---|---|
| DE | 19756195 | 12/1998 | |
| GB | 2077357 A * | 12/1981 | F01C 1/22 |
| GB | 2348672 | 10/2000 | |

* cited by examiner

*Primary Examiner* — Audrey B. Walter
(74) *Attorney, Agent, or Firm* — Joseph E. Maenner; MAENNER & ASSOCIATES, LLC

(57) ABSTRACT

An internal combustion engine includes a solid ring having a central plane bisecting the ring into a first side and a second side. A first pair of diametrically opposed pistons is located on the first side. A second pair of diametrically opposed pistons are located on the second side. The first pair of diametrically opposed pistons are offset from the second pair of diametrically opposed pistons by 90 degrees.

19 Claims, 11 Drawing Sheets

GAS-POWERED INTERNAL COMBUSTION ENGINE

BACKGROUND OF THE INVENTION

Field of the Invention

The invention relates to an internal combustion engine that is powered by a gas, such as hydrogen or methane.

Description of the Related Art

Internal combustion engines are well known and typically use a liquid as fuel, such as gasoline or diesel. With the desire to reduce the number of liquid fueled internal combustion engines in the name of climate change, there needs to be another solution. Gas-powered internal combustion engines are well known, but are not as efficient due to the losses in obtaining the gas, such as hydrogen, with a high enough efficiency to offset these efficiency issues.

It would be beneficial to provide a gas-powered internal combustion engine with a high relative efficiency.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an internal combustion engine that includes a solid ring having a central plane bisecting the ring into a first side and a second side. A first pair of diametrically opposed pistons is located on the first side. A second pair of diametrically opposed pistons are located on the second side. The first pair of diametrically opposed pistons are offset from the second pair of diametrically opposed pistons by 90 degrees.

In another embodiment, the present invention is an internal combustion engine comprising a housing and a solid ring rotatably located inside the housing. The solid ring has a central plane bisecting the ring into a first side and a second side. A first pair of diametrically opposed pistons is located on the first side. A second pair of diametrically opposed pistons is located on the second side. The first pair of diametrically opposed pistons is offset from the second pair of diametrically opposed pistons by 90 degrees. Four end faces are removably attached to the housing. Each end face is associated with one piston each of the first and second pairs of pistons and each of the end faces has an intake port, an exhaust port, and a pressure relief port.

In still another embodiment, the present invention provides an internal combustion engine comprising a housing and a circular ring rotatably located inside the housing. The ring has a plurality of pistons fixedly mounted thereon. A first end plate is located on a first side of the ring and a second plate on a second side of the ring, distal from the first side. The first and second plates each rotate relative to the housing. A plurality of end faces are removably attached to the housing. Each of the plurality of end faces is associated with one of the pistons and each end face includes an intake port, an exhaust port, and a pressure relief port.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
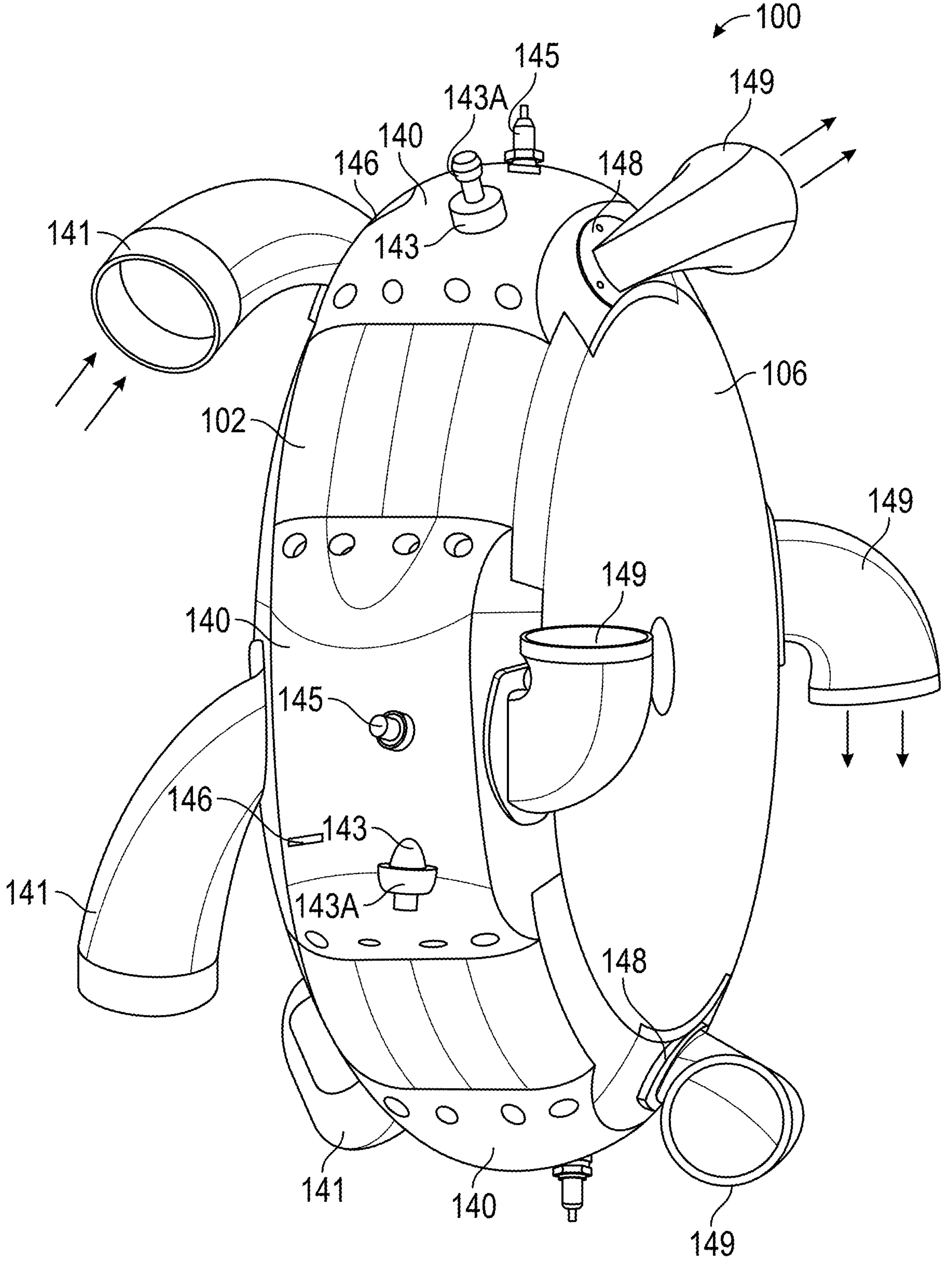
FIG. 1 is perspective view of a gas-fueled internal combustion engine according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Figure 2:
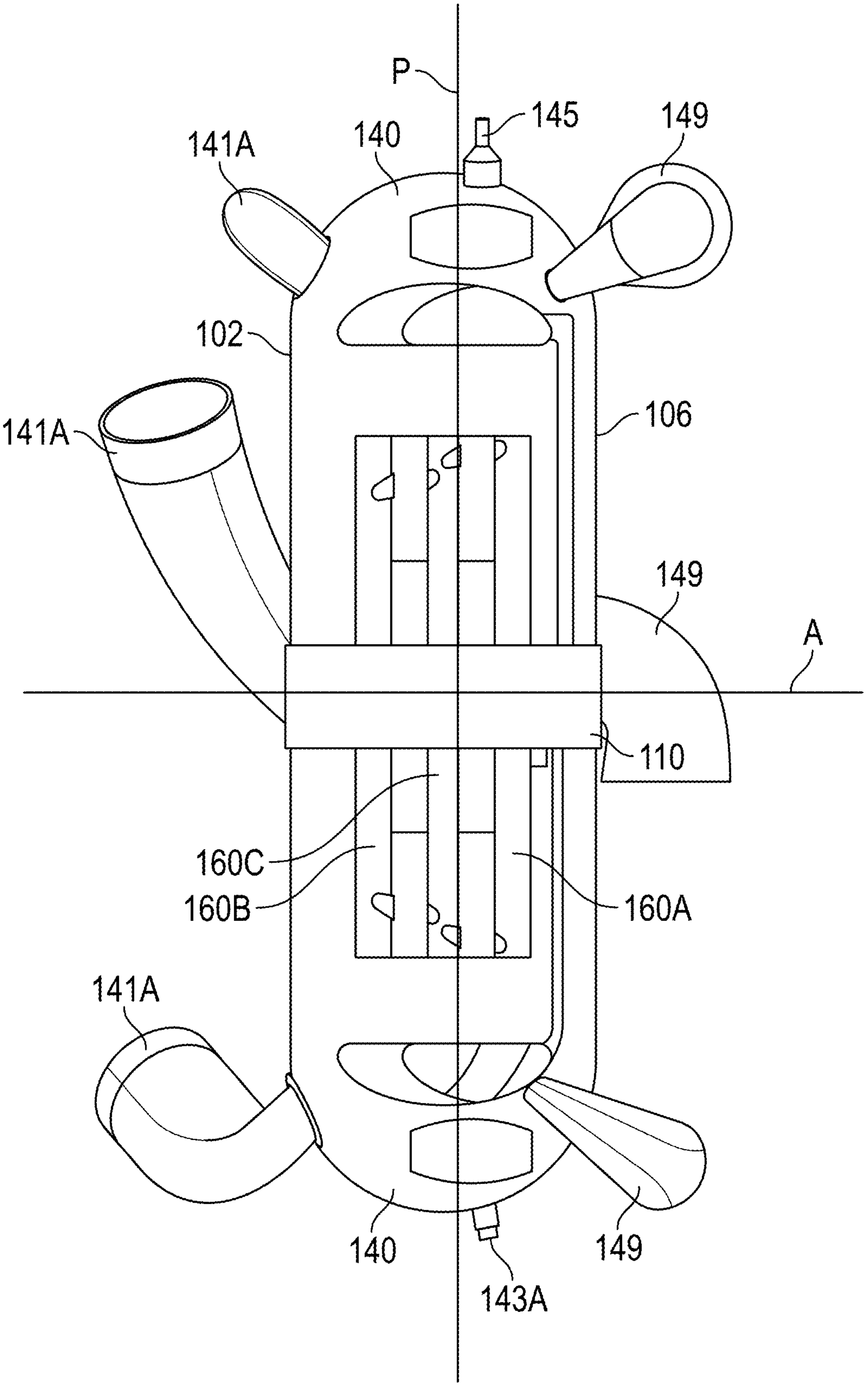
FIG. 2 is a side elevational view, in section, of the engine of FIG. 1.

Referring to the Figures in general and to FIG. 1 in particular, an internal combustion engine 100 that uses a gaseous fuel, such as hydrogen, methane, or any other suitable gaseous fuel or a liquid fuel, can be used. Engine 100 has a housing 102 that includes a generally circular outer perimeter 104, with generally flat first side 106 fixedly formed with outer perimeter 104. A second side 108, opposite first side 106, is removable attached to housing 102. Second side 108 can be removed from housing 102 to build engine 102 and to perform maintenance on engine 100. An output shaft 110 extends outwardly through second side, 108 along an axis "A" about which output shaft 110 rotates. A plane "P" generally bisects engine 100 as shown in FIG. 2.

In an exemplary embodiment, engine 100 is a 4-cylinder engine, although those skilled in the art will recognize that engine 100 can be more or less than four cylinders. Engine 100 is a four cycle engine, with intake, compression, combustion, and exhaust stages in each cycle.

Figure 3:
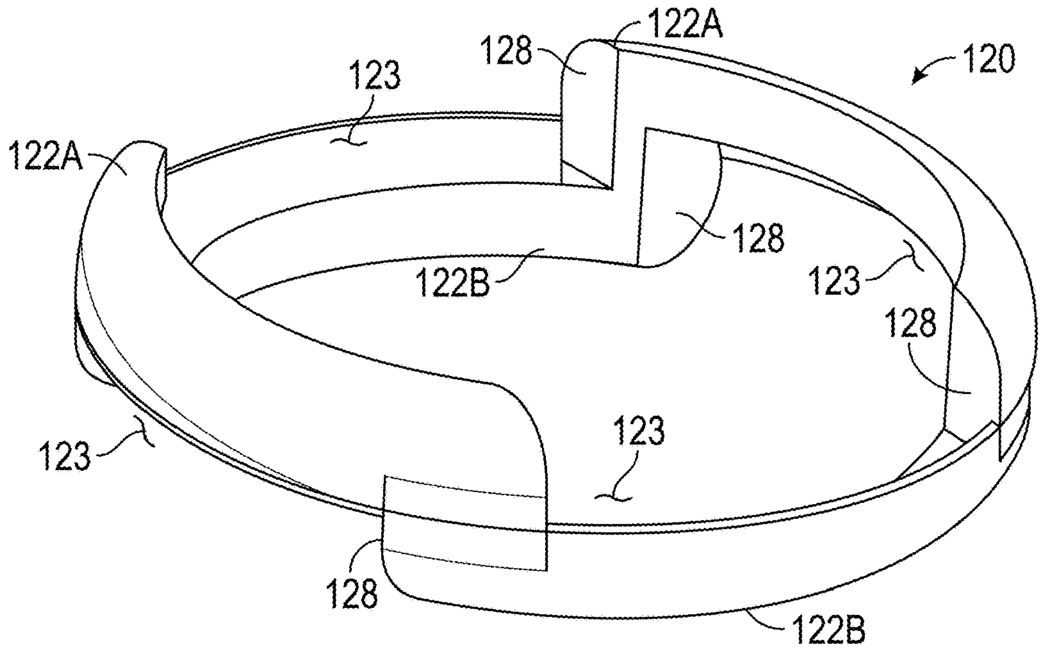
FIG. 3 is a perspective view of a piston ring used with the engine of FIG. 1.
Figure 4:
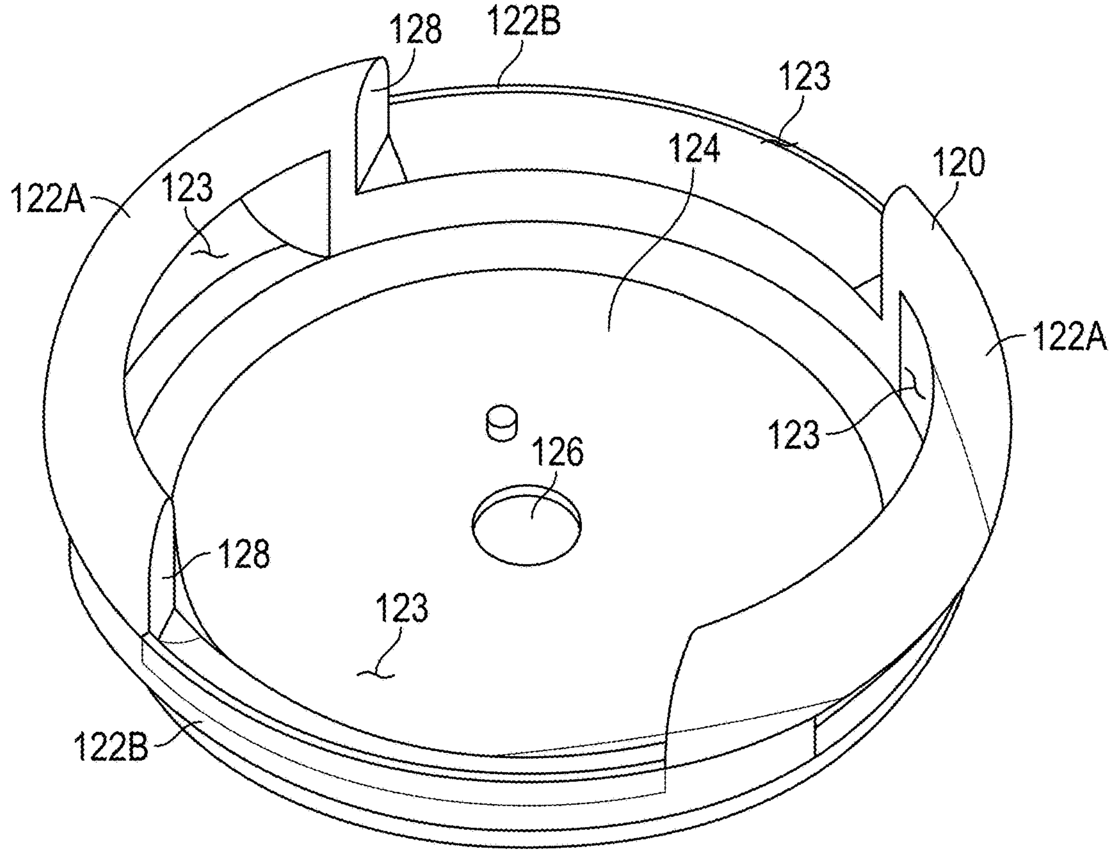
FIG. 4 is a perspective view of the piston ring of FIG. 3 with an endplate.

Referring to FIGS. 3, and 4 a solid, generally circular piston ring 120 is rotatably located inside the housing 102 such that plane P bisects the ring 120. Piston ring 120 has a plurality of pistons 122 fixedly mounted thereon. A first pair of pistons 122A is located such that each piston 122A is located on a first side of plane P diametrically across axis A from the other of the first pair of pistons 122A. A second pair of pistons 122B is located along the second side of plane P between each of the first pair of pistons 122A such that each of second pair of pistons 122B are diametrically across axis A from each other. Each piston 122 is associated with one of the four cylinders in engine 100. Each piston 122 extends about 90 degrees around the perimeter of piston ring 120 with an air gap 123 of about 90 degrees extending between each piston 122 on either side of plane P.

An end plate 124 is located on a first side of the piston ring 120. End plate 124 has a through opening 126 to accommodate an end of shaft 110 to stabilize shaft 110 as shaft 110 rotates relative to the housing 102. End plate 124 is attached to the first pair of diametrically opposed pistons 122A. Output shaft 110 is attached to a center of end plate 124 and rotates with end plate 124 and piston ring 120. As engine 100 operates, piston ring 120 rotates about axis A, thereby rotating output shaft 110. The power output of engine 100 is thus transferred from piston ring 120 to shaft 110 via end plate 124.

Each side of the pistons 122 comprises an end wall 128, each end wall 128 forming a side wall of air gap 123 such that an air gap 123 is provided on either side of each piston 122, providing a gap between pistons 122 on with side of plane P. End walls 128 are angled obliquely relative to a radius toward axis A.

Figure 5:
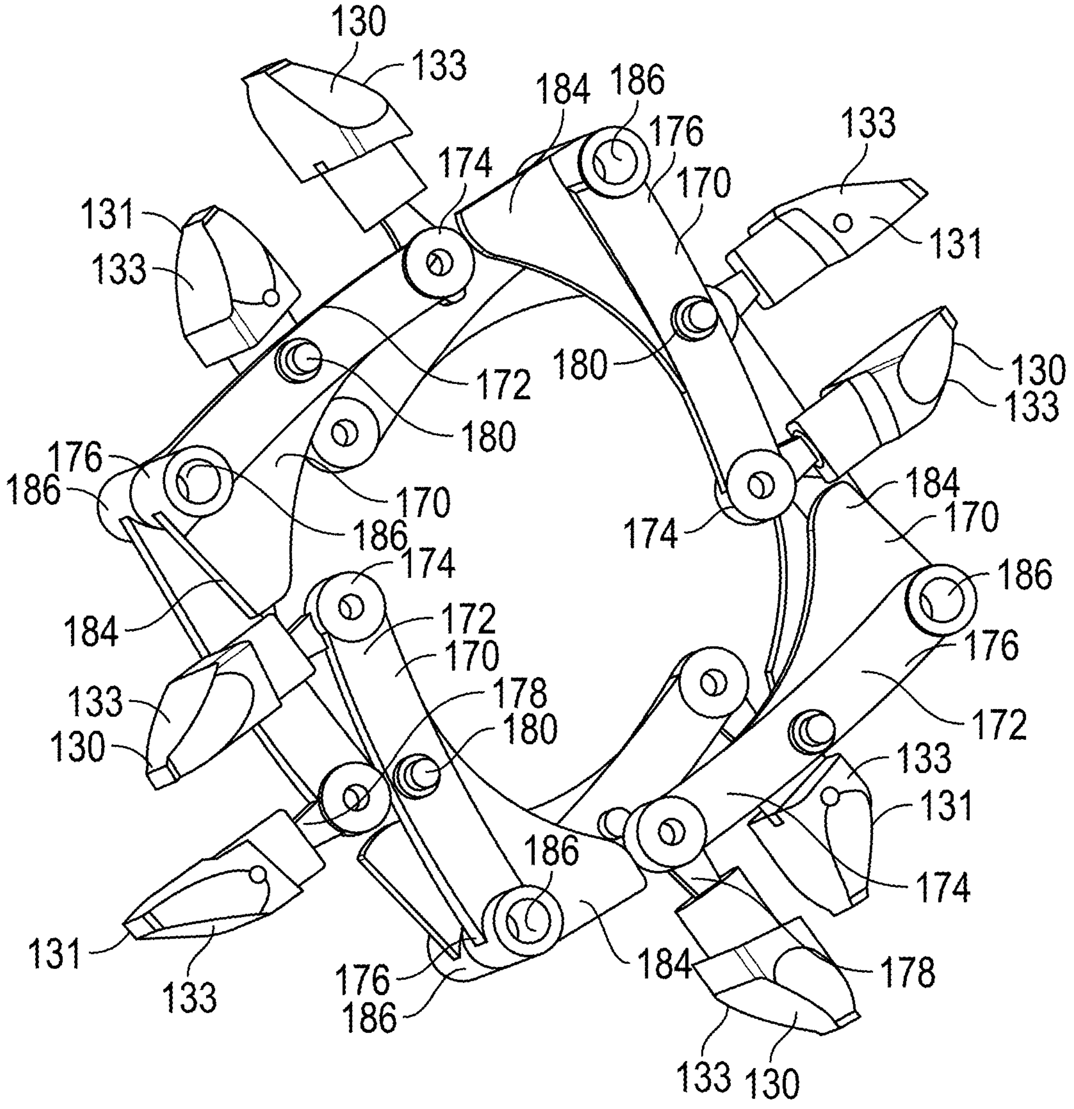
FIG. 5 is a perspective view of a valve and linkage assembly used with the engine of FIG. 1.
Figure 6:
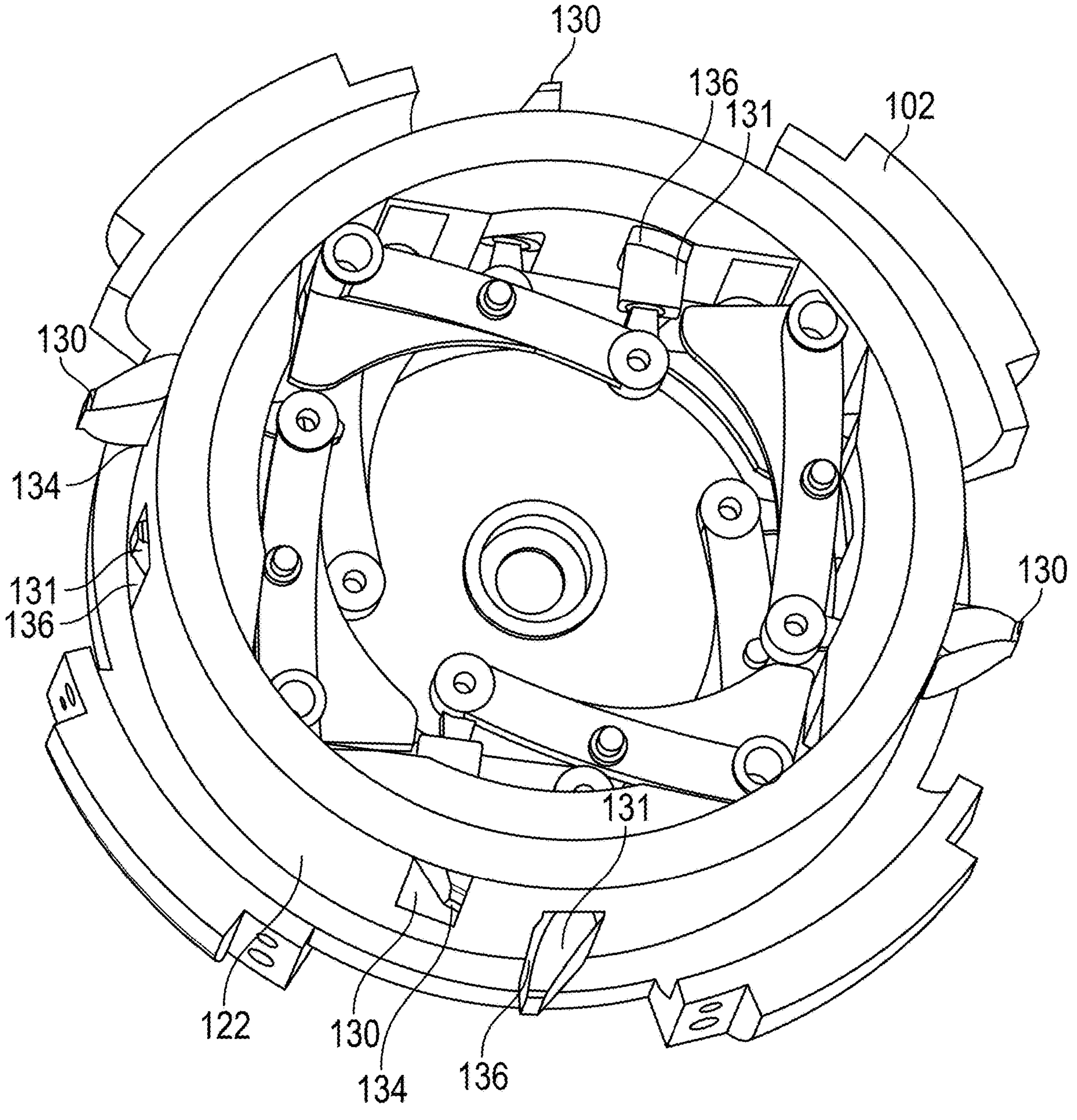
FIG. 6 is a perspective view of the valve and linkage assembly of FIG. 5 inserted into the engine of FIG. 1.
Figure 8:
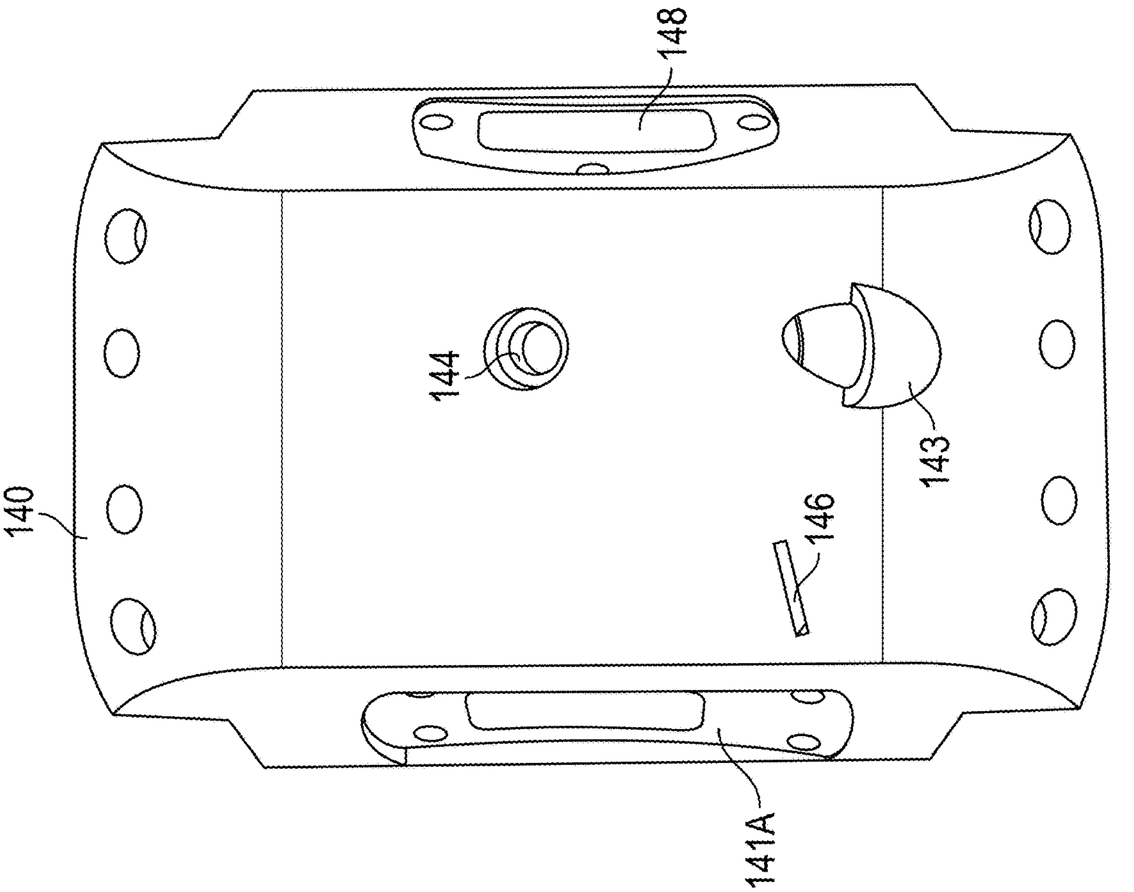
FIG. 8 is an outside perspective view of the end plate of FIG. 7.
Figure 7:
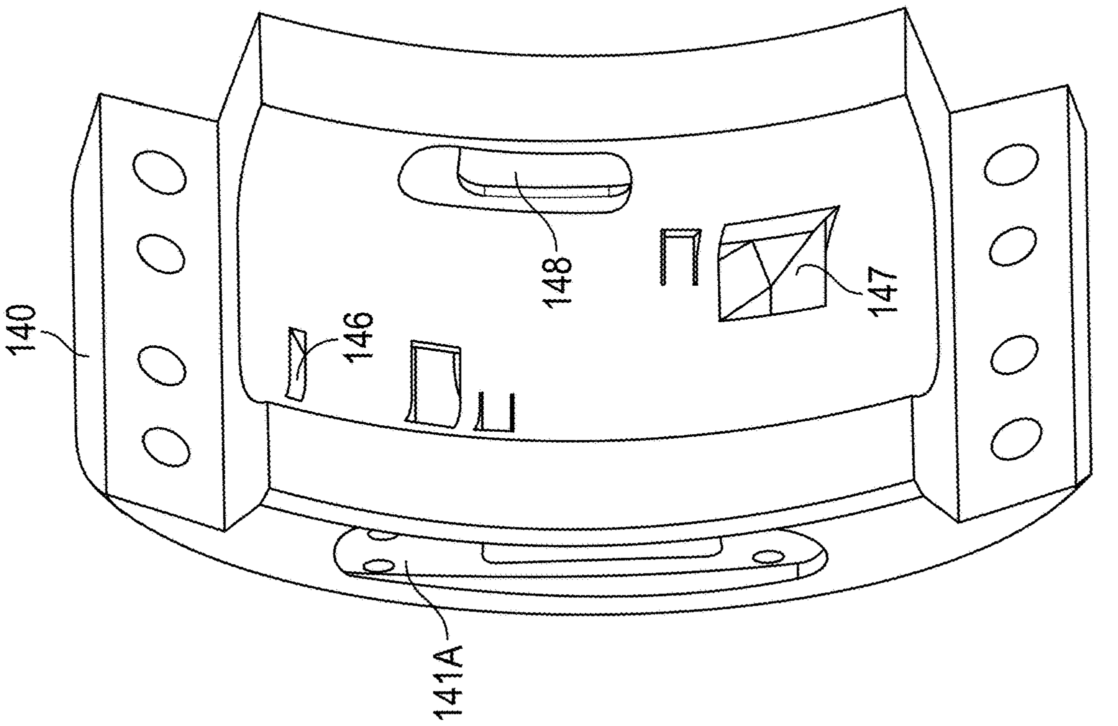
FIG. 7 is an inside perspective view of an end plate used with the engine of FIG. 1.
Figure 12:
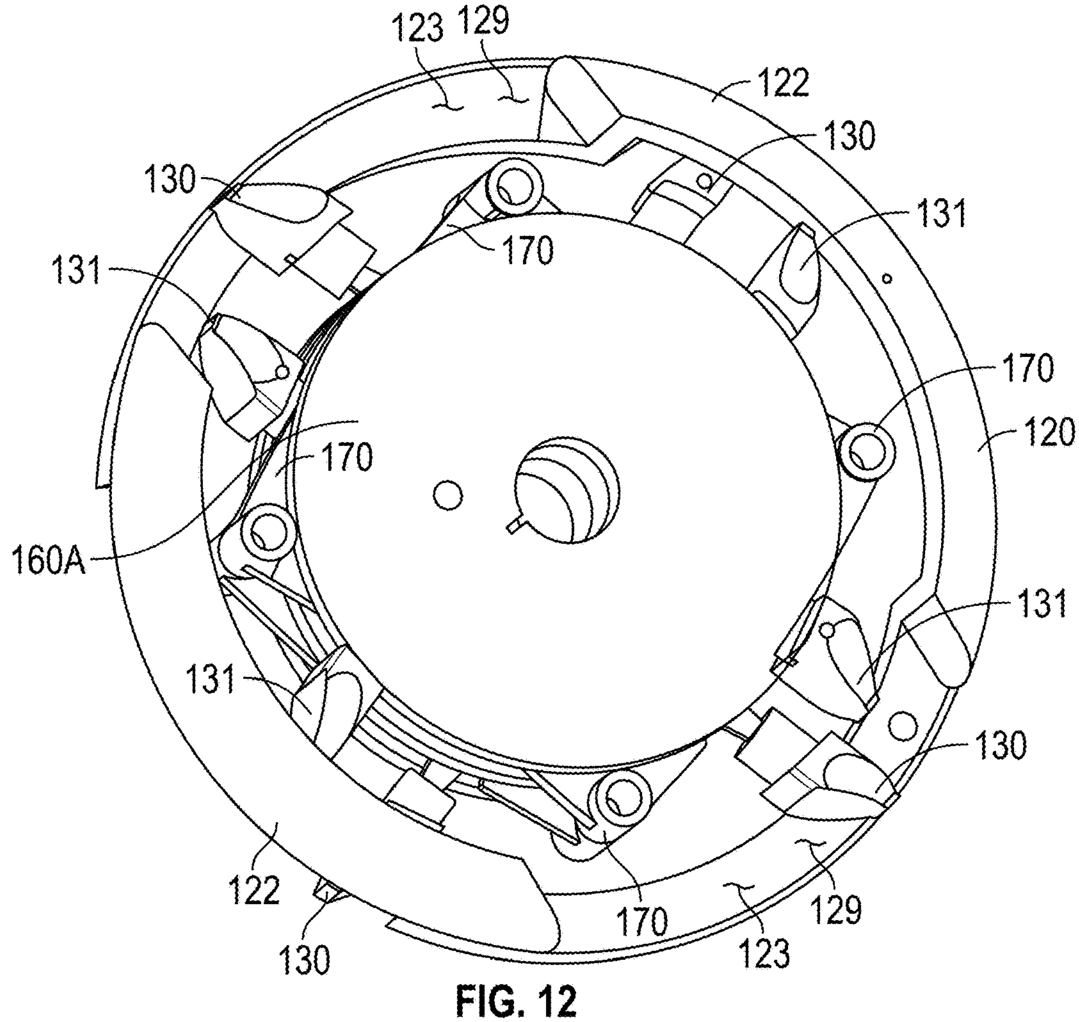
FIG. 12 is a perspective view showing the linkage of FIG. 5, the timing plate of FIG. 10, inside the piston ring of FIG. 3.

Referring to FIGS. 5, 6, and 12, a plurality of valves 130, 131 are configured to move radially outwardly to each close each compression chamber 129 and radially inwardly to each open each compression chamber 129. A compression chamber 129 is the space in air gap 123 between end wall 128 and a valve 130, 131 that is extended radially outwardly into air gap 123. Each valve 130, 131 has an obliquely directed face 133 that matches with angled end walls 128 on pistons 122 to help direct air into air gap 123 between adjacent pistons 122 on either side of piston ring 120 and to help force combusted air out of air gap 123 for ejection from engine 100. A fixed cylindrical radially inner wall 132 also forms part of each compression chamber 129. Inner wall 132 has a plurality of through-openings 134, 136 to allow valves 130, 131 to reciprocate generally radially inwardly and outwardly. As piston ring 120 rotates, valves 130, 131 reciprocate through through-openings 134, 136 to selectively open and close each compression chamber 120 around the periphery of engine 100.

Referring to FIGS. 1 and 7-9, replaceable end faces 140 along the outer perimeter provide connections for air intake, fuel supply, ignition source (spark plug), and exhaust for each cylinder of engine 100. Valves 130, 131 are provided in pairs such that each pair of valves 130, 131 is associated with one end face 140.

Figure 9:
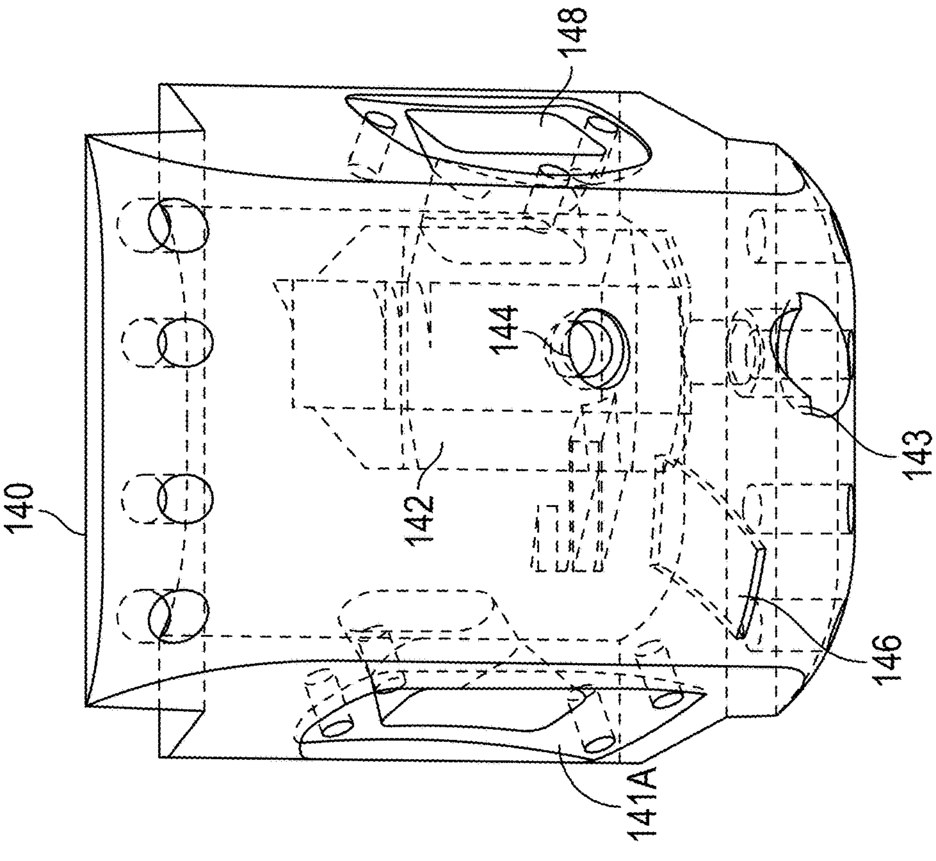
FIG. 9 is an internal view of the end plate of FIG. 7.

Referring to FIG. 1, end face includes an air intake port 141 that draws air from outside of engine 100 through opening 141A into the compression chamber. A combustion chamber 142, shown only in FIG. 9, is located inside of end face 140. A fuel injection port 143 receiving a fuel injector 143A is in fluid communication with combustion chamber 142 to inject fuel into combustion chamber 142. A spark plug port 144 is also in fluid communication with combustion chamber 142. A spark plug 145 (shown in FIG. 1) in spark plug port 144 provides an ignition source to ignite the fuel/air mixture inside combustion chamber 142. Combustion chamber 142 is also in fluid communication with air gap 123 between pistons 122 via a passage 147 to both direct compressed air from the compression stage into combustion chamber 142 and to discharge combusted air from combustion chamber 142 to air gap 123.

A relief port 146 is formed in each of the replaceable end faces 140 and is also in fluid communication with combustion chamber 142. Relief ports 146 have computer-controlled valves (not shown) that are used to throttle an amount of intake air inside each combustion chamber 142 to provide lean/rich mixtures as a function of a desired power and/or speed of the engine 100.

An exhaust port 148 is provided in end face 140 to discharge combusted air out of engine 100 to exhaust outlet 149 (shown in FIG. 1). Exhaust port 148 provides for fluid communication between pistons 122 and atmosphere.

End faces 140 are configured to be replaceable so that end faces 140 can be easily swapped with other replaceable end faces 140 to alter sizes of the intake ports 141, combustion chambers 142, and the exhaust ports 148. Such size alterations can be used to adjust the power output of engine 100.

Figure 10:
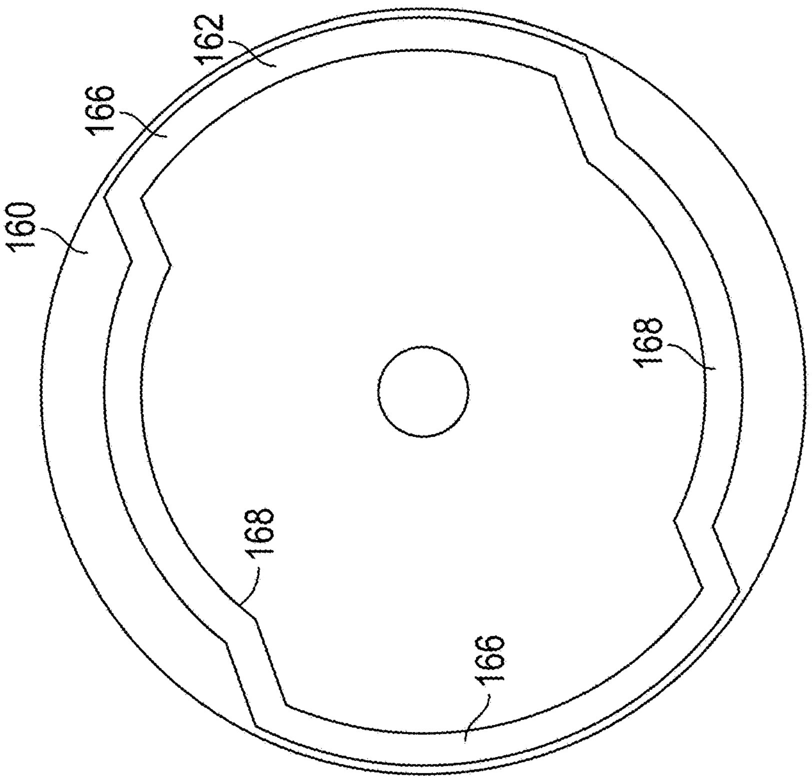
FIG. 10 is a top plan view of a timing plate used with the engine of FIG. 1.

A plurality of timing plates 160 are provided inside engine 100 and are used to operate valves 130, 131. An exemplary design of timing plate 160 is shown in FIG. 10. A cam channel 162 is formed in each plate 160 such that a cam follower 180 (shown in FIG. 11) rides along inside cam channel 162 of one of the plurality of timing plates 160. Timing plate 160 is attached to end plate 124 and rotates with piston ring 120. When timing plate 160 rotates and cam follower 180 is riding inside cam channel 162 of timing plate 160 at an outer perimeter portion 166, valves 130 whose cam followers 180 are in cam channel 162 in that location are projected radially outwardly and into air gap 123, closing chambers and, when the cam follower 180 is riding along cam channel 162 between outer perimeter portions 166 at locations 168, valves 131 whose cam followers 180 in cam channel 162 in that location are withdrawn radially inwardly and out of air gap 123, as shown in FIG. 12.

Referring back to FIG. 2, the plurality of timing plates 160 comprises three stacked timing plates 160A, 160B, 160C. A first outer timing plate 160A is associated with the first pair of pistons 122A and a second outer timing plate 160B is associated with the second pair of pistons 122B. A center timing plate 160C, located between the first outer timing plate 160A and the second outer timing plate 160B, is associated with both the first pair of pistons 122A and the second pair of pistons 122B and has a cam channel 162 extending outwardly from each of the opposing sides of center plate 160C.

Figure 11:
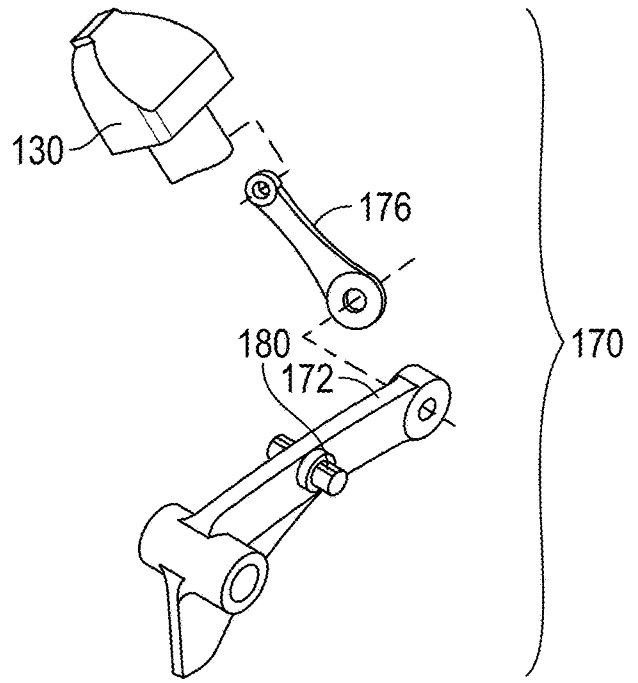
FIG. 11 is an exploded view of a linkage shown in FIG. 5.

Referring back to FIG. 5 and to FIG. 11, each of the plurality of valves 130, 131 are connected to a mechanical linkage 170. Four linkages 170 are located between first outer timing plate 160A and center timing plate 160C, while four additional linkages 170 a located between second outer timing plate 160B and center timing plate 160C.

Each linkage 170 has a first, elongate leg 172 having a free end 174 and a connected end 176, with a valve linkage 178 pivotally attached to free end 174 of elongate leg 172. A valve 130, 131 is attached to valve linkage 178. A cam follower 180 extends outwardly from elongate leg 172 about half way between free end 174 and connected end 176. Cam follower 180 rides along the inside of cam channel 162 on its respective associated timing plate 160A, 160B, 160C. With respect to each pair of four linkages 170, two cam followers 180 located diametrically across axis P from each other ride in a cam channel 162 on one of the outer plates 160A, 160B while the remaining two cam followers 180 ride in cam 162 on center plate 160C.

A second, short leg 184 is attached to connected end 176 at a pivot tube 186 and extends about 90 degrees from the length of elongate leg 172. Pivot tube 186 on a first linkage 170 is rotatably mounted next to an adjacent linkage 170 as shown in FIG. 5) via a pivot pin (not shown) that extends longitudinally through both pivot tubes 186. Although not shown, biasing members, such as, for example, torsion springs (not shown), can be provided to bias each linkage 170 individually at short leg 184 to reduce vibration of linkages 170 as engine 100 operates.

Figure 13:
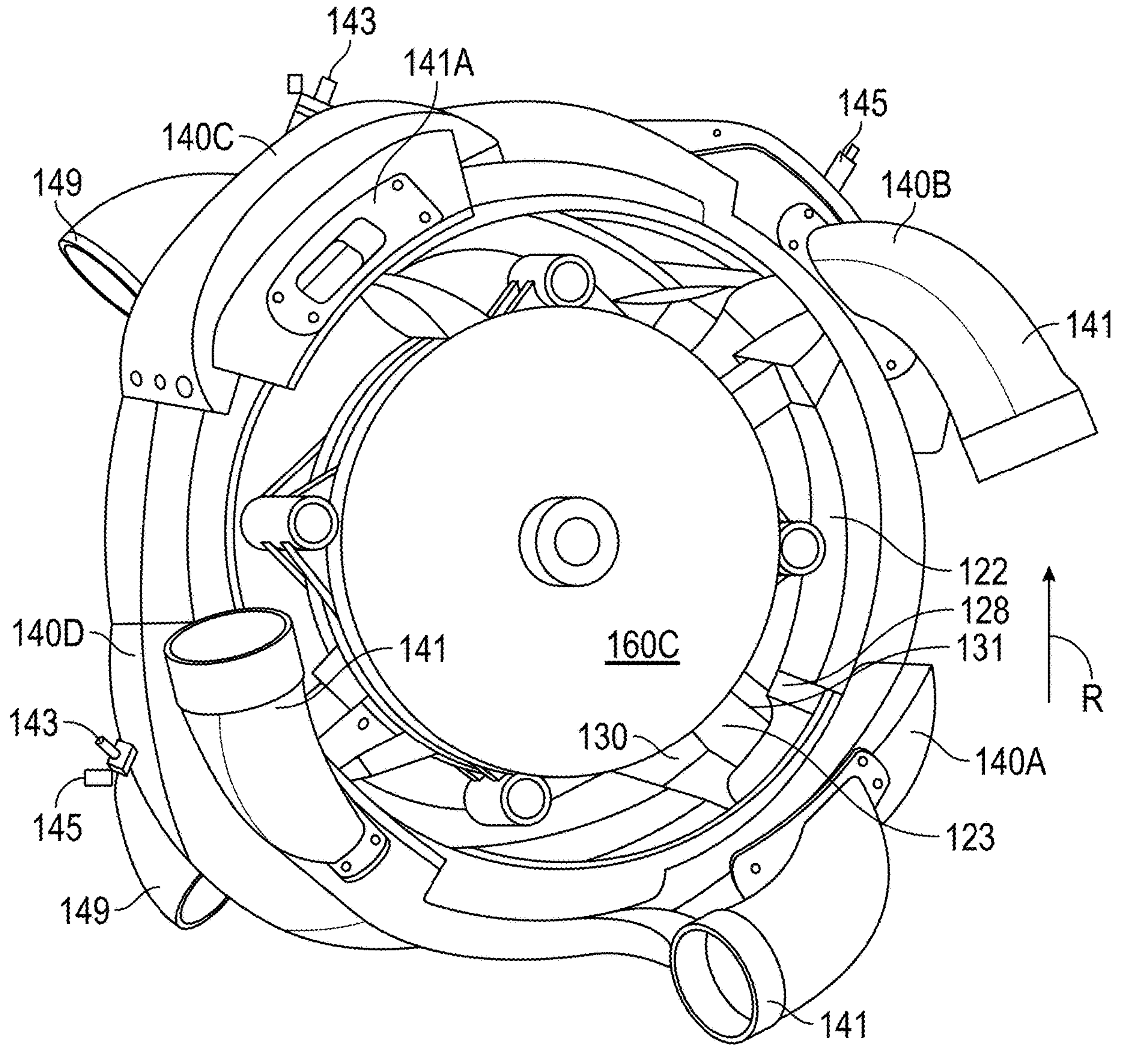
FIG. 13 is a perspective view of an intake stage of the operation of the engine of FIG. 1.
Figure 14:
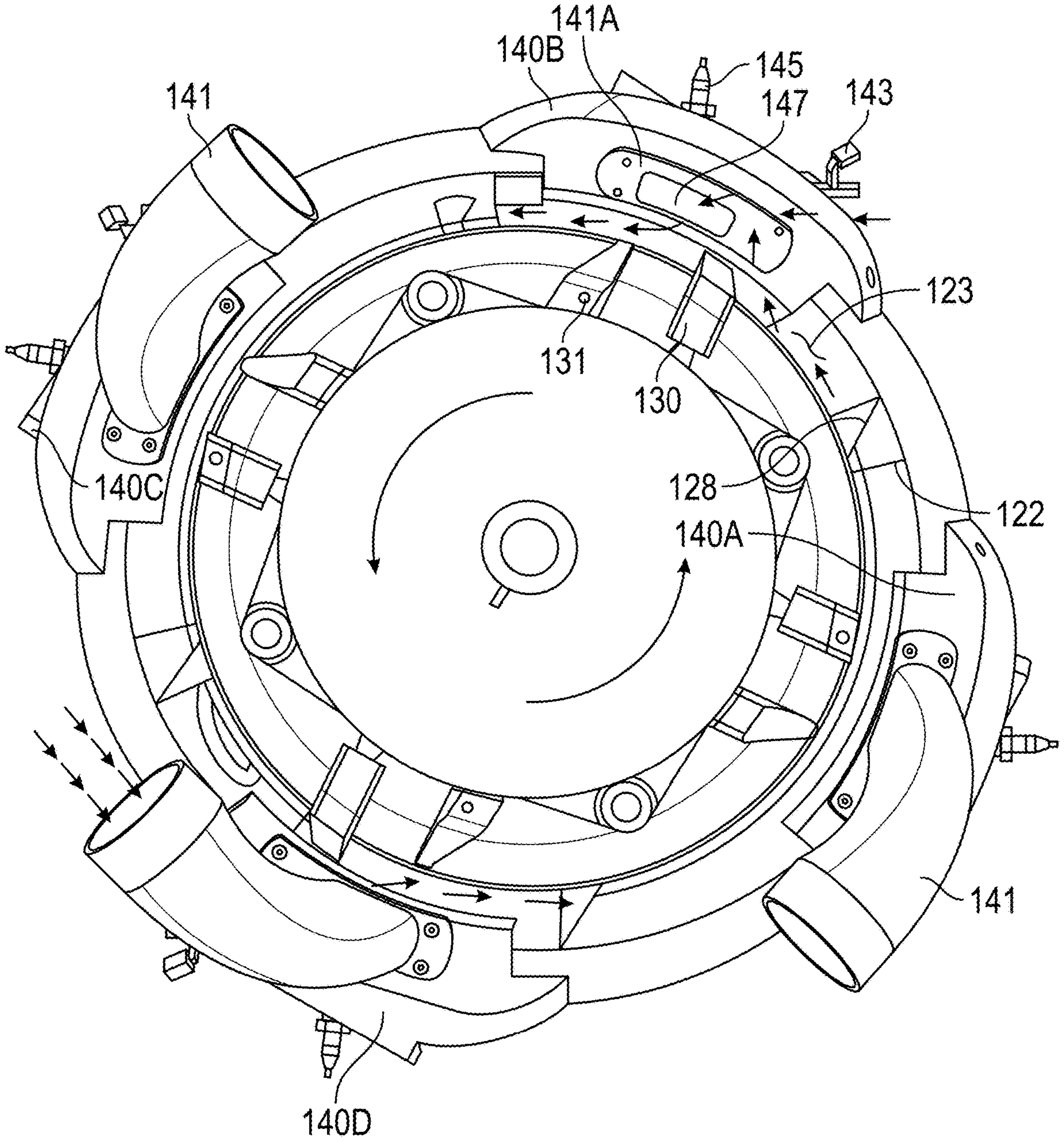
FIG. 14 is a perspective view of a compression stage of the operation of the engine of FIG. 1; an FIG. 15 is a perspective view of an exhaust stage of the operation of the engine of FIG. 1.
Figure 15:
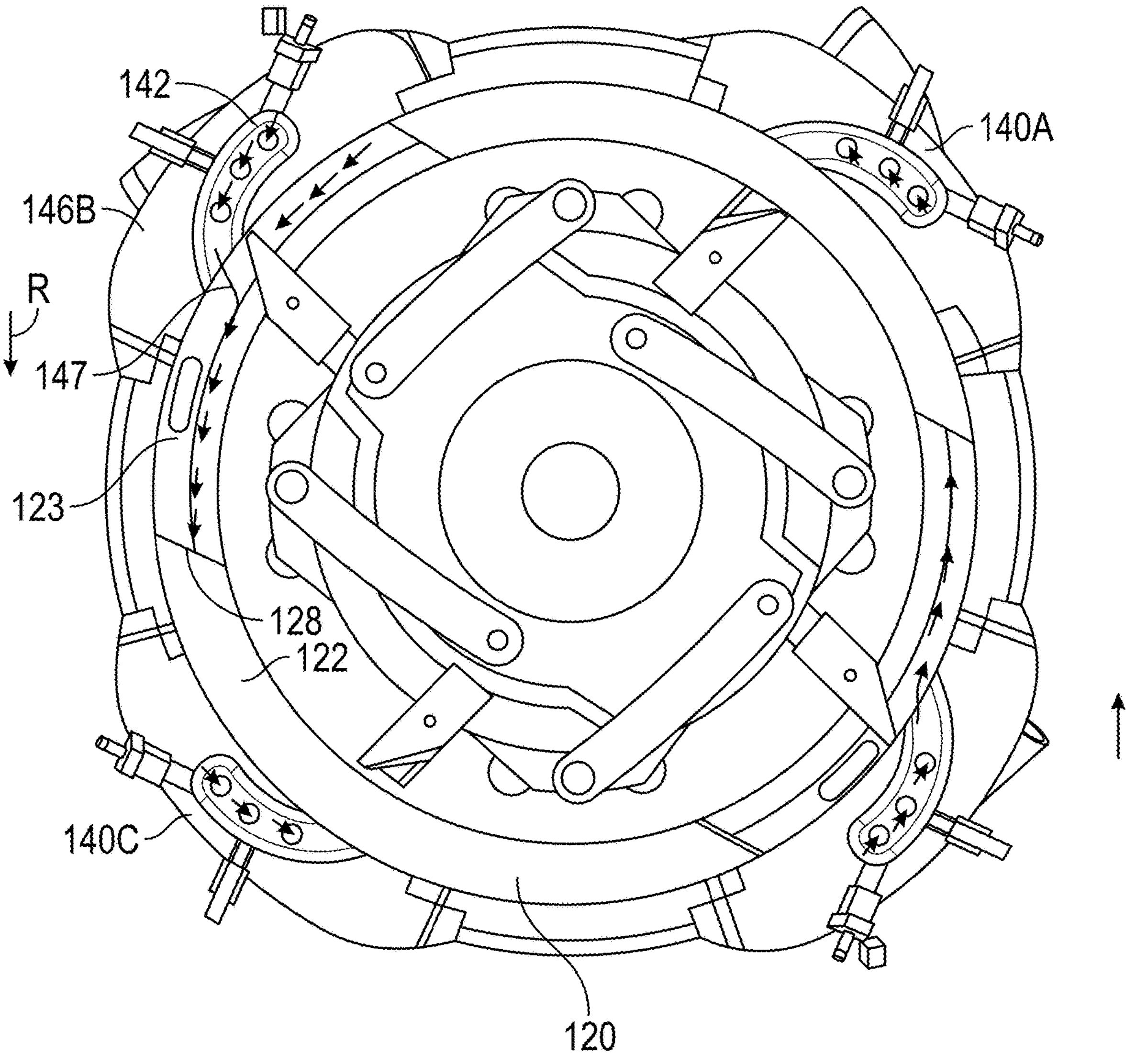

In general, any event or process that is occurring at a location in engine 100 is also happening simultaneously 180 degrees across axis A. Referring to FIGS. 13-15, to operate engine 100, engine 100 rotates in a counter-clockwise direction of arrow "R" looking into the plane of FIG. 13. By way of example only, three end plates 140, labeled end plates 140A, 140B, 140C, respectively, are used in a single combustion cycle.

Referring to end plate 140A, in the air intake stage, piston 120 is rotated such that end wall 128 of piston 122 and a valve 131 form a compression chamber 123. Air intake port 141 is opened to draw in air from atmosphere via a suction effect generated by the rotation of piston ring 122, which enlarges the size of compression chamber 123 downstream of valve 131. The air flows into air gap 123 and is compressed as piston end wall 128 moves toward passage 147 in end face 140B, shown in FIG. 14. The compressed air enters combustion chamber 142 in end face 140B via passage 147 as shown by the arrows in FIG. 14, where the fuel is mixed in with the air through fuel injection port 143. Spark plug 145 sparks, igniting the air/fuel mixture in combustion chamber 142 and expanding the combusted air into air gap 123 and driving piston ring 120 in the direction shown by arrow R in FIG. 15.

As further shown in FIG. 15, the combusted air exits combustion chamber 142 via passage 147 in end face 140B and pushes against end wall 128 of piston 122 in air gap 123, driving piston around toward end face 140C, where the exhaust gas exits engine 100 through exhaust port 148 to an exhaust line 149 in end face 140C.

For standard operation of engine, the same stages are performed simultaneously with respect to end faces 140C, 140D, 140A, respectively. Similarly, a combustion cycle is initiated at end face 140B, through end face 140C, and ending at end face 140D, with a simultaneous combustion cycle being performed with respect to end faces 140D, 140A, and 140B. In a power and fuel conserving mode, engine 100 can be operated with the combustion cycle stages being performed in end face 140A, 140C, and 140A; 140B, 140D, 140B; 140C, 140A, 140C; and 140D, 140B, 140D.

It will be further understood that various changes in the details, materials, and arrangements of the parts which have been described and illustrated in order to explain the nature of this invention may be made by those skilled in the art without departing from the scope of the invention as expressed in the following claims.

I claim:

1. An internal combustion engine comprising:

a solid ring having a central plane bisecting the ring into a first side and a second side;

a first pair of diametrically opposed pistons on the first side; and a second pair of diametrically opposed pistons on the second side, the first pair of diametrically opposed pistons offset from the second pair of diametrically opposed pistons by 90 degrees, wherein each of the pistons comprises an end wall, each end wall forming a wall of a combustion chamber.

2. The internal combustion engine according to claim 1, further comprising a plurality of valves configured to move radially outwardly to each close a compression chamber and radially inwardly to each open the compression chamber.

3. The internal combustion engine according to claim 2, wherein the plurality of valves are each connected to a mechanical linkage.

4. The internal combustion engine according to claim 3, wherein each mechanical linkage includes a cam follower.

5. The internal combustion engine according to claim 4, further comprising a plurality of timing plates such that each cam follower rides inside one of the plurality of timing plates.

6. The internal combustion engine according to claim 5, wherein the plurality of timing plates comprises three stacked timing plates and wherein a first outer timing plate is associated with the first pair of pistons, a second outer timing plate is associated with the second pair of pistons, and wherein a center timing plate is associated with both the first pair of pistons and the second pair of pistons.

7. The internal combustion engine according to claim 1, further comprising an end plate attached to the first pair of diametrically opposed pistons.

8. The internal combustion engine according to claim 7, further comprising a timing plate attached to the end plate.

9. The internal combustion engine according to claim 1, further comprising an air intake port for each piston on the first side of the plane.

10. The internal combustion engine according to claim 9, further comprising an exhaust port for each piston on the second side of the plane.

11. The internal combustion engine according to claim 10, further comprising replaceable end faces configured to be swapped with other replaceable end faces to alter sizes of the intake ports and the exhaust ports.

12. The internal combustion engine according to claim 11, further comprising a relief port formed in each of the replaceable end faces.

13. The internal combustion engine according to claim 12, wherein each of the relief ports is computer controlled to throttle an amount of intake air inside a combustion chamber to provide lean/rich mixtures as a function of a desired power and/or speed of the engine.

14. An internal combustion engine comprising a housing;

a solid ring rotatably located inside the housing, the solid ring having a central plane bisecting the ring into a first side and a second side;

a first pair of diametrically opposed pistons on the first side;

a second pair of diametrically opposed pistons on the second side, the first pair of diametrically opposed pistons offset from the second pair of diametrically opposed pistons by 90 degrees;

and four end faces removably attached to the housing, each end face being associated with one piston each of the first and second pairs of pistons, each of the end faces having an intake port, an exhaust port, and a pressure relief port.

15. The internal combustion engine according to claim 14, further comprising two valves associated with each end face.

16. The internal combustion engine according to claim 15, further comprising an internal wall inside the solid ring.

17. The internal combustion engine according to claim 16, wherein each of the valves extends through the internal wall.

18. The internal combustion engine according to claim 17, wherein each of the valves reciprocates radially through the wall.

19. An internal combustion engine comprising:

a housing;

a circular ring rotatably located inside the housing, the ring having a plurality of pistons fixedly mounted thereon;

a first end plate on a first side of the ring;

a second plate on a second side of the ring, distal from the first side, wherein the first and second plates each rotate relative to the housing; and a plurality of end faces removably attached to the housing, each of the plurality of end faces being associated with one of the pistons, each of the end faces having an intake port, an exhaust port, and a pressure relief port.

* * * * *